US010159039B2

United States Patent
Kannan

(10) Patent No.: US 10,159,039 B2
(45) Date of Patent: Dec. 18, 2018

(54) STEERING WIRELESS LOCAL AREA NETWORK (WLAN) CLIENTS

(71) Applicant: Fortinet, Inc., Sunnyvale, CA (US)

(72) Inventor: Venkatesh Kannan, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/491,172

(22) Filed: Apr. 19, 2017

(65) Prior Publication Data

US 2018/0310240 A1    Oct. 25, 2018

(51) Int. Cl.
*H04W 48/20* (2009.01)
*H04W 48/14* (2009.01)
*H04W 8/24* (2009.01)
*H04W 24/08* (2009.01)
*H04W 8/22* (2009.01)
*H04W 84/12* (2009.01)

(52) U.S. Cl.
CPC .......... *H04W 48/20* (2013.01); *H04W 8/22* (2013.01); *H04W 8/24* (2013.01); *H04W 24/08* (2013.01); *H04W 48/14* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0125039 A1* | 7/2003 | Lachtar | H04W 72/02 455/453 |
| 2007/0274211 A1* | 11/2007 | Tsubota | H04W 76/34 370/229 |
| 2015/0312894 A1* | 10/2015 | Chen | H04W 16/18 370/329 |
| 2015/0341899 A1* | 11/2015 | Irigi | H04W 68/02 455/456.1 |
| 2018/0013474 A1* | 1/2018 | Cordeiro | H04B 7/0413 |

* cited by examiner

*Primary Examiner* — Frantz Bataille
(74) *Attorney, Agent, or Firm* — Hamilton, DeSanctis & Cha LLP

(57) ABSTRACT

Systems and methods for steering WiFi clients based on capabilities of the clients and access points (APs) are provided. According to one embodiment, multiple access points (APs) of a wireless local area network (WLAN) receives probe requests from a WLAN client for joining the WLAN. The APs forward the probe requests to an AP controller (AC) that controls the APs of the WLAN. The AC selects one or more of the multiple APs based at least on the matching of the capability of the WLAN client and capabilities of the multiple APs and sends a confirmation to one or more of selected APs. The selected APs accept the probe requests to allow the WLAN client to join the WLAN through the one or more selected APs.

18 Claims, 10 Drawing Sheets

```
VHT Capabilities Info: 0x33907132
    .... .... .... ..10 = Maximum MPDU Length: 11 454 (0x2)
    .... .... .... 00.. = Supported Channel Width Set: Neither 160MHz nor 80+80 supported (0x0)
    .... .... .... .1.. = Rx LDPC: Supported
    .... .... .... 1... = Short GI for 80MHz: Supported
    .... .... ...0 .... = Short GI for 160MHz and 80+80MHz: Not supported
    .... .... ..0. .... = Tx STBC: Not supported
    .... .... 001. .... = Rx STBC: 1 Spatial Stream Supported (0x1)
    .... ...0 .... .... = SU Beam-former Capable: Not supported
    .... ..1. .... .... = SU Beam-formee Capable: Supported
    ...0 11.. .... .... = Compressed Steering Number of Beamformer Antennas Supported: 4 (0x3)
    000. .... .... .... = Number of Sounding Dimensions: 1 (0x0)
    ...0 .... .... .... = MU Beam-former Capable: Not supported
    ..1. .... .... .... = MU Beam-formee Capable: Supported
    .0.. .... .... .... = VHT TXOP PS: Not supported
    0... .... .... .... = +HTC-VHT Capable (VHT variant HT Control field): Not supported
    .111 .... .... .... = Max A-MPDU Length: 1 048 575 (0x7)
    00.. .... .... .... = VHT Link Adaptation: No Feedback (0x0)
    ..1. .... .... .... = Rx Antenna Pattern Consistency: Supported
    .1.. .... .... .... = Tx Antenna Pattern Consistency: Supported
    00.. .... .... .... =
```

FIG. 10

STEERING WIRELESS LOCAL AREA NETWORK (WLAN) CLIENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention relate generally to computer networking, and more specifically, to steering WiFi clients based on capabilities of the clients and the wireless access points (APs).

Description of the Related Art

Along the developments of WLAN technology, WiFi clients and APs products under different standards are widely deployed. These standards may include the Institute of Electrical and Electronics Engineers (IEEE) 802.11 standards, such as 802.11a/b/g/n/AC Wave 1/AC Wave 2. Under different standards, the WiFi clients and APs may use different bands, such as the 2.4 and 5 gigahertz bands and have different transmission speeds, such as 54 Mbps to 6.77 Gbps. Usually, a new 802.11 standard is compatible with prior (older) standards, i.e., an AP compatible with a new 802.11 standard is capable of providing wireless connectivity to a WiFi client compatible with an older standard 802.11. However, some features of a new standard can be implemented by APs and WiFi clients compatible with the new standard. For example, multiple user-multiple input/multiple output (MU-MIMO) of the Wave 2 version of IEEE 802.11ac allows multiple users to simultaneously connect in parallel with a MIMO radio. This feature can be implemented only when multiple WiFi clients and the associated AP support MU-MIMO. When 802.11n or 802.11ac Wave 1 clients are connected to an 802.11ac Wave 2 AP, MU-MIMO cannot be used by the AP. When WiFi clients are within an overlapping area that is covered by multiple APs, which of the multiple APs to which the WiFi clients are to be connected is determined by users of the WiFi clients and WiFi clients with different capabilities may be distributed randomly among the APs serving the same area. The mixture of WiFi clients served by an AP with high capability may result in other WiFi clients being unable to take advantage of the high capability AP.

Therefore, there is a need for the ability to steer WiFi clients to APs having matched capabilities in order to optimize AP utilization and WiFi client performance.

SUMMARY

Systems and methods for steering WiFi clients based on capabilities of the clients and access points (APs) are provided. According to one embodiment, multiple access points (APs) of a wireless local area network (WLAN) receives probe requests from a WLAN client for joining the WLAN. The APs forward the probe requests to an AP controller (AC) that controls the APs of the WLAN. The AC selects one or more of the multiple APs based at least on the matching of the capability of the WLAN client and capabilities of the multiple APs and sends a confirmation to one or more of selected APs. The selected APs accept the probe requests to allow the WLAN client to join the WLAN through the one or more selected APs.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 10 shows an example of capability information fields contained in a probe request frame body.

DETAILED DESCRIPTION

Figure 1:
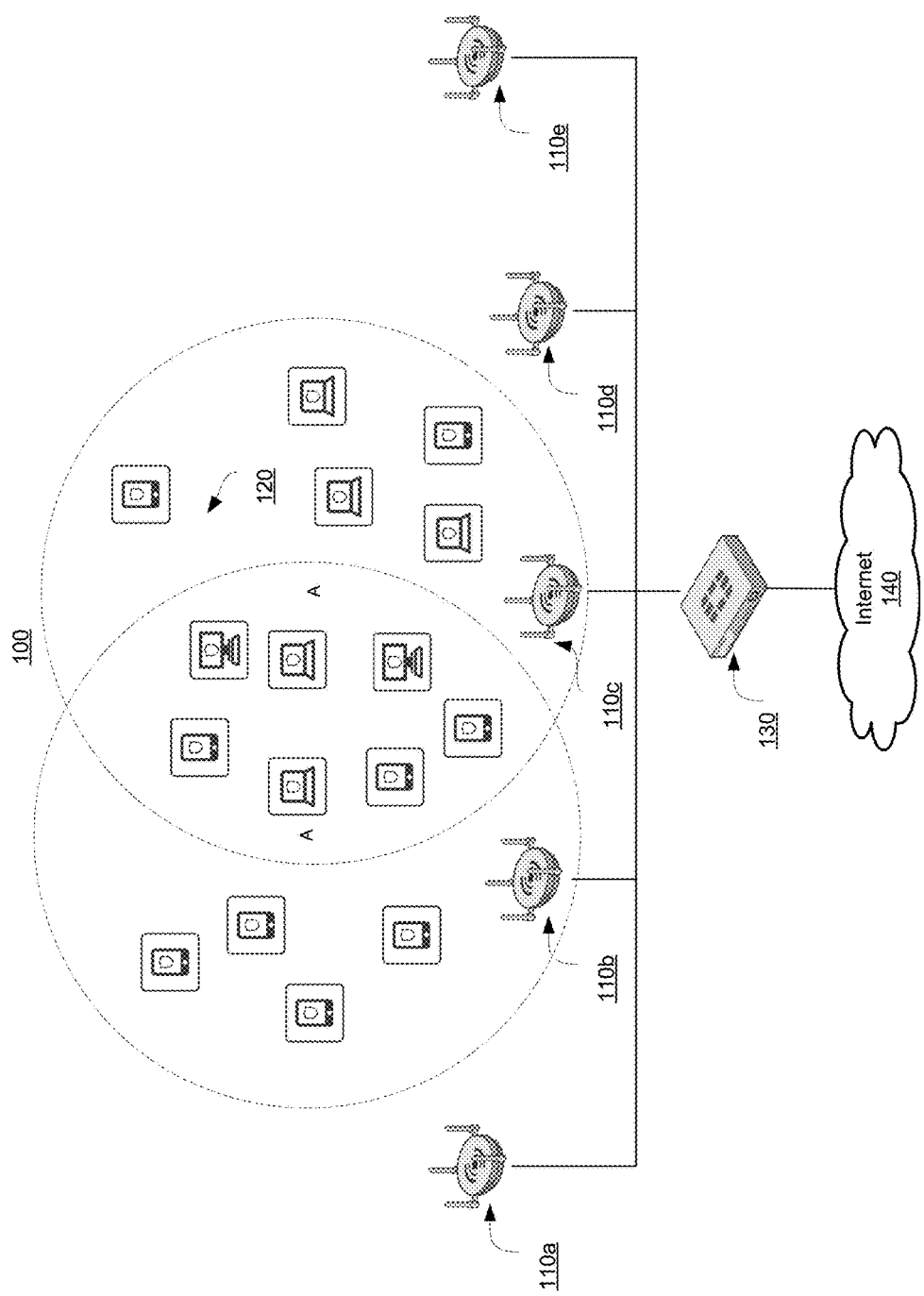
FIG. 1 illustrates an exemplary network architecture in accordance with an embodiment of the present invention.

Systems and methods for steering WiFi clients based on capabilities of the clients and access points (APs) are provided. According to one embodiment, multiple access points (APs) of a wireless local area network (WLAN) receive probe requests from a WLAN client for joining the WLAN. The APs forward the probe requests to an AP controller (AC) that controls the APs of the WLAN. The AC selects one or more of the multiple APs based at least on the matching of the capabilities of the WLAN client and capabilities of the multiple APs and sends a confirmation to one or more of the selected APs. The selected APs accept the probe requests to allow the WLAN client to join the WLAN through the one or more selected APs.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier Wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary wireless network system 100 in which or with which embodiments of the present invention may be used. Wireless network system 100 includes multiple access point (APs) 110a-e that are mounted at different locations within an area (e.g., a venue, a campus or an enterprise) Each AP 110a-e can provide a WiFi connection for WiFi clients/users 120 that are within its coverage. In embodiments of the present invention, some of APs 110a-e (i.e., AP 110b and AP 110c) may be neighboring APs that have the same or overlapping coverage areas. WiFi clients 120 may access a private and/or public network, such as the Internet 140 through the APs. APs 110a-e may be connected to an access point controller (AC) 130 through a wired network (e.g., cables). AC 130 may push AP profiles to APs 110a-e and manage the wireless connectivity of APs 110a-e so that a WiFi client may roam among APs 110a-e and network traffic of neighboring APs may be load-balanced by AC 130. In embodiments of the present invention, WiFi clients 120 within an area that is covered by multiple APs 110a-e may be steered to APs whose capabilities most closely match the capabilities of the WiFi clients 120.

Figure 2:
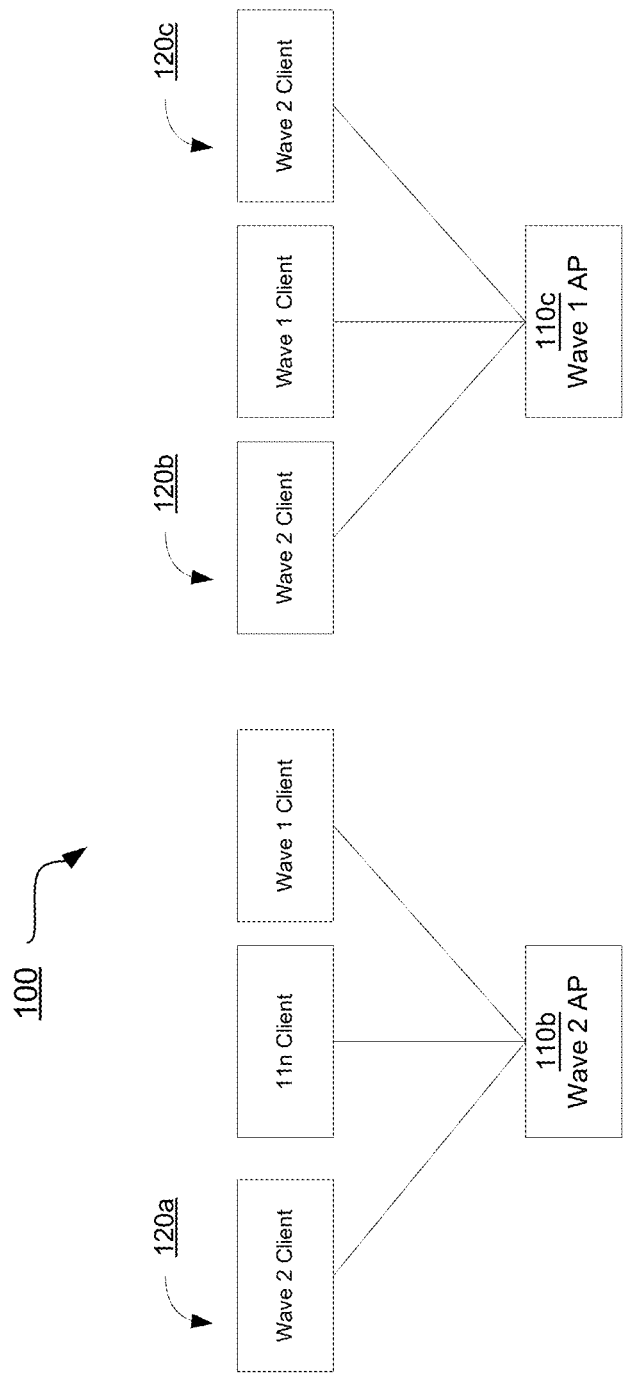
FIG. 2 illustrates WLAN client distribution among multiple neighboring APs in a prior art WiFi network.

FIG. 2 shows an example of the random distribution of WiFi clients 120, having different capabilities, within an area covered by neighboring APs 110b and 110c, having different capabilities, in the context of a WLAN 100 implementing prior art WLAN technology. In the present example, three WiFi clients with capabilities of 802.11n, 802.11ac Wave 1 and 802.11ac Wave 2 are connected/ associated with AP 110b with the capability of 802.11ac Wave 2 and three WiFi clients with capabilities of 802.11ac Wave 1 and 802.11ac Wave 2 are connected/associated to AP 110c with the capability of 802.11ac Wave 1 by the users of WiFi clients or by AC 130 for load-balancing. In this example, MU-MIMO functionality of 802.11ac Wave 2 cannot be implemented even though both AP 110b and WiFi client 120a have the capability of MU-MIMO because no other WiFi clients associated with AP 110b has the MU-MIMO capability. Meanwhile, WiFi clients 120b and 120c with MU-MIMO capability cannot implement the MU-MIMO capability because these WiFi clients are connected to AP 110c, which is an 802.11ac Wave 1 AP without the MU-MIMO capability.

Figure 3:
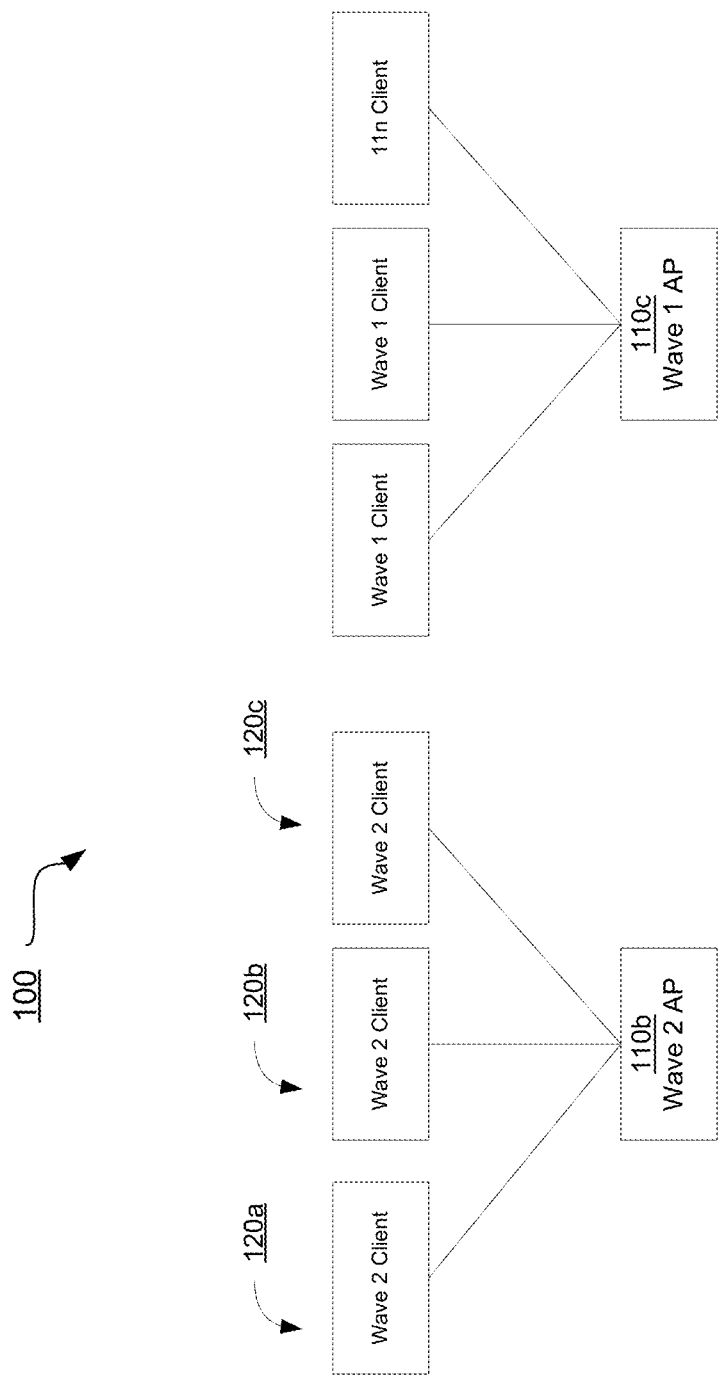
FIG. 3 illustrates WLAN client distribution among multiple neighboring APs in a WiFi network in accordance with an embodiment of the present invention.

FIG. 3 illustrates WLAN client distribution among multiple neighboring APs 110b and 110c in a WiFi network 100 in accordance with an embodiment of the present invention. In the context of the present example, WiFi clients 120a-c are steered to AP 110b among multiple neighboring APs (e.g., APs 110b and 110c) at least partially based on matching the capabilities of the neighboring APs with the capabilities of WiFi clients 120 when WiFi clients 120 initiate probe requests to APs 110. As shown in FIG. 3, WiFi clients 120a-c with MU-MIMO capability are steered to AP 110b that also supports MU-MIMO. In this manner, the MU-MIMO capability can be implemented because multiple clients associated with the same AP all support MU-MIMO functionality. Meanwhile, WiFi clients supporting 802.11ac Wave 1 and 802.11n are steered to AP 110c with 802.11ac Wave 1, having capabilities greater than or equal to the capabilities of WiFi clients 120. The process of steering WiFi clients to appropriate APs among neighboring APs based on capabilities of the WiFi clients and the APs will be described in further detail below with reference with FIGS. 4 and 5.

The advantage of MU-MIMO is reducing airtime and increasing throughput; however, when only one MU-MIMO client is associated with a Wave 2 AP, then it is simply treated as a non-MU-MIMO client as in order to experience the advantages of MU-MIMO, a minimum of two MU-MIMO clients need to be associated with the same Wave 2 AP. As such, in one embodiment, in addition to steering clients to neighboring APs based on capabilities of the WiFi clients and the APs, Wave 2 clients may also be steered to a neighboring Wave 2 AP when it is the only one connected to the AP. For example in a scenario in which there are two neighboring Wave 2 APs—one with which only one MU-MIMO client (an isolated MU-MIMO client) is associated and other with which one or more MU-MIMO clients are associated, the isolated MU-MIMO client may be steered to the other Wave 2 AP so as to benefit from the advantages of MU-MIMO.

Figure 4A:
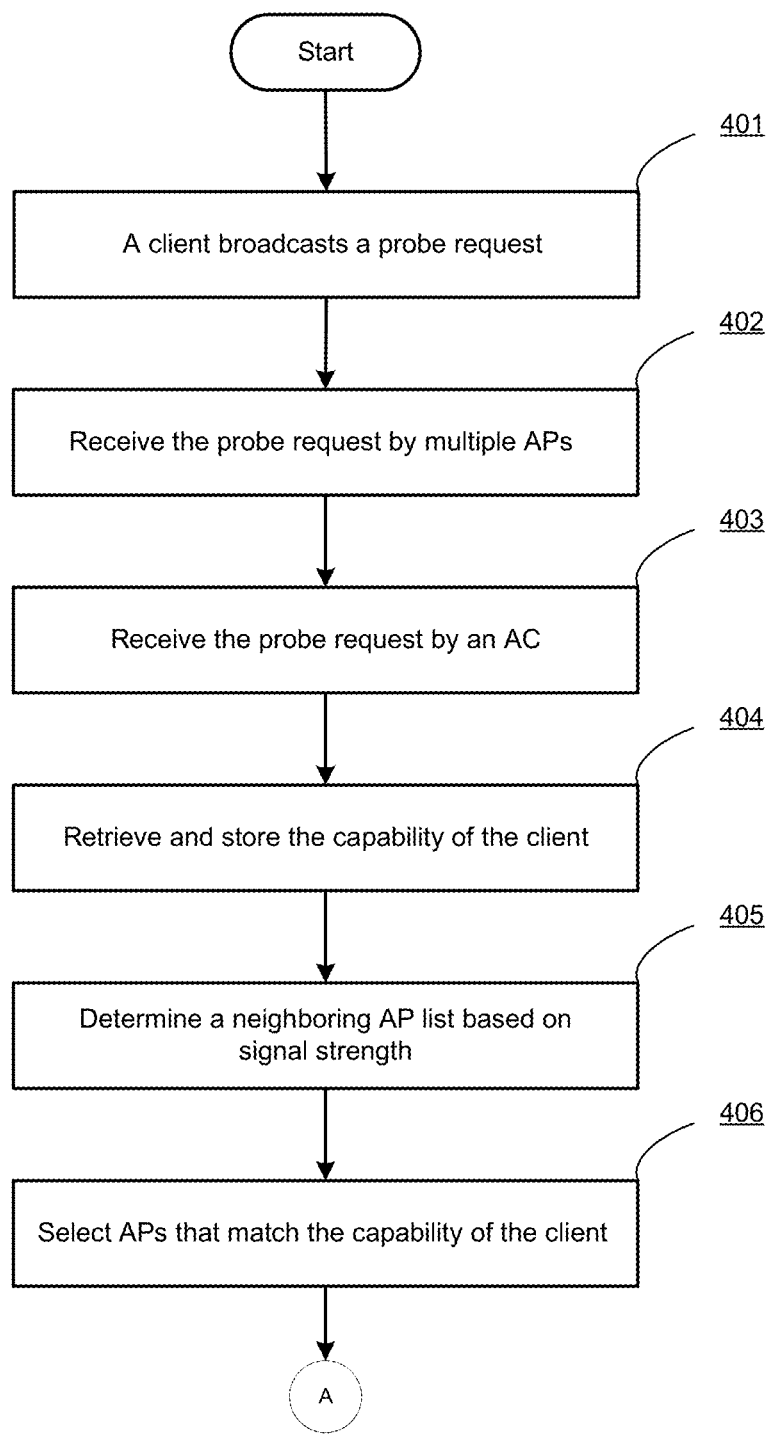
FIGS. 4A and 4B are flow diagrams illustrating a method for steering a WiFi client to an AP with matched capabilities in accordance with an embodiment of the present invention.
Figure 4B:
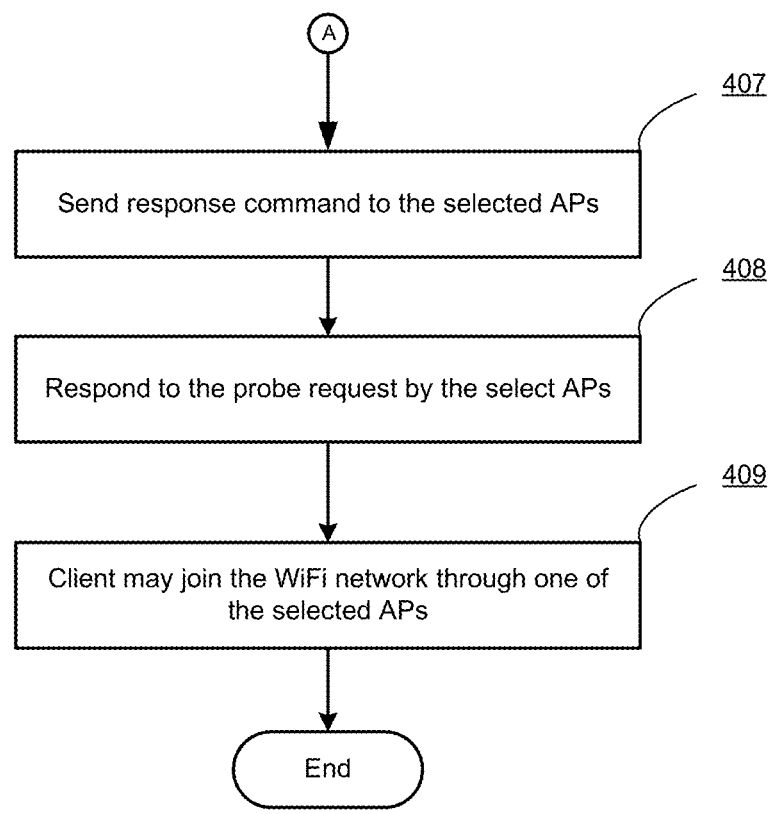

FIGS. 4A and 4B are flow diagrams illustrating a method for steering a WiFi client to an AP with matched capabilities in accordance with an embodiment of the present invention. In the present embodiment, a WiFi network comprises multiple APs that are managed by an AC. The APs are deployed at different locations to provide WiFi connectivity to WiFi clients in their respective coverage areas. Some APs are neighboring APs that have overlapping coverage areas and WiFi clients within the overlapping coverage areas may be steered to an AP that has capabilities most closely matching those of the WiFi clients.

At block 401, a WiFi client broadcasts a probe request when the client tries to join a WiFi network. According to the 802.11 standard, a WiFi client sends a probe request management frame asking what network is available on a channel when the WiFi client is in active scanning mode. The source address of the probe request is the MAC address of the WiFi client and the destination address is the broadcast address (ff:ff:ff:ff:ff:ff) and capability information of the WiFi client is embedded in the probe request frame body. FIG. 10 shows an example of capability information fields contained in a probe request frame body. In this example, the MU Beam-formee Capable bit is set to 1, which means that this WiFi client support MU-MIMO.

Once the probe request is sent, the WiFi client starts a countdown timer and waits for answers.

At block 402, the probe request broadcasted by the WiFi client is received by multiple APs within range of the WiFi client. Each AP may determine the signal strength (e.g., Received Signal Strength Indication (RSSI) and Signal-to-Noise Ratio (SNR)) of the probe request that is received by the AP. The probe requests received by the multiple APs and the signal strengths are forwarded to the AC through, for example, a Control and Provisioning of Wireless Access Points (CAPWAP) control tunnel between the APs and the AC.

At block 403, the AC receives the probe requests and signal strengths information from the APs.

At block 404, the AC retrieves the MAC address and capability information of the WiFi client from the probe request. For example, the AC may examine the MU Beam-formee Capable bit of the capability information field to determine whether the WiFi client supports MU-MIMO. The AC may determine which 802.11 standard is supported by the WiFi client by parsing all the capability information contained in the probe request.

Further, in one embodiment, the MAC address and corresponding capability information of the WiFi client may be stored within a WiFi client database maintained by the AC. As such, when probe requests are subsequently received from a WiFi client for which capability information has previously been determined and stored by the AC, such capability information can be retrieved by the AC from the WiFi client database rather than parsing the capability information from the probe request.

At block 405, the AC may determine neighboring APs of the WiFi client based on the signal strengths of the probe requests received by the multiple APs. Although the probe request may be received by the multiple APs that are within range of the WiFi client, some APs may be too far away from the WiFi client and the signal strengths of the probe requests received by these APs may be lower than a threshold for reliable packet delivery. For example, the minimum signal strength for web and email applications may be −70 dBm. The AC may select the APs that have signal strengths higher that the minimum signal strength as the neighboring APs of the WiFi client and a neighboring AP list may be created for the WiFi client.

At block 406, the AC selects the APs that have the most closely matched capabilities to that of the WiFi client from the neighboring AP list. As the AC is managing the operations of APs of the WiFi network, the AC has access to the capabilities information as well as other software and hardware configurations of each AP of the WiFi network. The AC may compare the capabilities of the neighboring APs with the capabilities of the WiFi client. The AC may then select those of the APs from the neighboring APs based on the following rules:

1. If one or more of the neighboring APs has the same capability as the capability of the WiFi client, then select these APs to respond to the probe request.

2. If no AP of the neighboring APs has the same capability as that of the WiFi client, then one or more APs of the neighboring APs with the closest capabilities to the capability of the WLAN client may be selected. In one embodiment, when the capabilities of all of the neighboring APs are greater than the capability of the WiFi client, one or more APs having the least capability are selected from the neighboring APs; however, when the capabilities of all the neighboring APs are less than the capability of the WiFi client, one or more APs having the greatest capability are selected from the neighboring APs are selected.

In one example, if a WiFi client supporting 802.11ac Wave 2 is probing the WiFi network, the AC may select:
  I. An 802.11ac Wave 2 AP when an 802.11ac Wave 2 AP is in the neighboring AP list;
  II. An 802.11ac Wave 1 AP when no AP in the neighboring list supports 802.11ac Wave 2;
  III. An 802.11n AP when no AP in the neighboring AP list supports 802.11ac.

In another example, if a WiFi client supporting 802.11n is probing the WiFi network, the AC may select:
  I. An 802.11n AP when an 802.11n AP is in the neighboring AP list;

II. An 802.11ac Wave 1 AP when no APs in the neighboring AP list supports 802.11n;
III. An 802.11ac Wave 2 AP when no APs in the neighboring AP list support 802.11n or 802.11ac Wave 1.

At block 407, the AC sends a response command to the selected APs through, for example, the CAPWAP control tunnels between the AC and the selected APs. Optionally, the AC may send an ignore command to the other APs (those not selected).

At block 408, the selected APs receive the response command from the AC and send probe responses to the WiFi client while other APs not selected by the AC ignore the probe request.

At block 409, the WiFi client may join the WiFi network through one of the selected APs that has the most closely matched capability to that of the WiFi client.

In embodiments of the present invention, a WiFi client is steered to APs with the most closely matching capabilities when the WiFi client is probing the APs. In this manner WiFi clients within overlapping coverage areas of multiple APs are associated with the most closely matched capabilities and thereby allowing the APs and WiFi clients to take advantage of capabilities offered by newer WLAN communications standards. For example, in the context of FIG. 3, multiple WiFi clients 120a-c supporting the IEEE 802.11ac Wave 2 standard are steered to an 802.11ac Wave 2 AP, thereby allowing MU-MIMO to be implemented to provide faster transmission and increase capacity of WiFi network 100.

The process of steering a WiFi client to an AP with the most closely matched capability may be repeated when the WiFi client roams to a coverage area of another AP. For example, when a WiFi client is roaming to a new location, a probe request broadcasted by the WiFi client is received by a new AP. The new AP forwards the probe request to the AC to determine if the new AP should respond to the probe request. The AC may check whether the capability of the new AP matches that of the WiFi client. If the new AP has closer matching capabilities to the WiFi client than the current AP with which the WiFi client is associated, the AC sends a deauthentication command to the current AP. The current AP then sends a deauthentication message to the WiFi client, thereby allowing the new AP to start the association process with the WiFi client.

Figure 5:
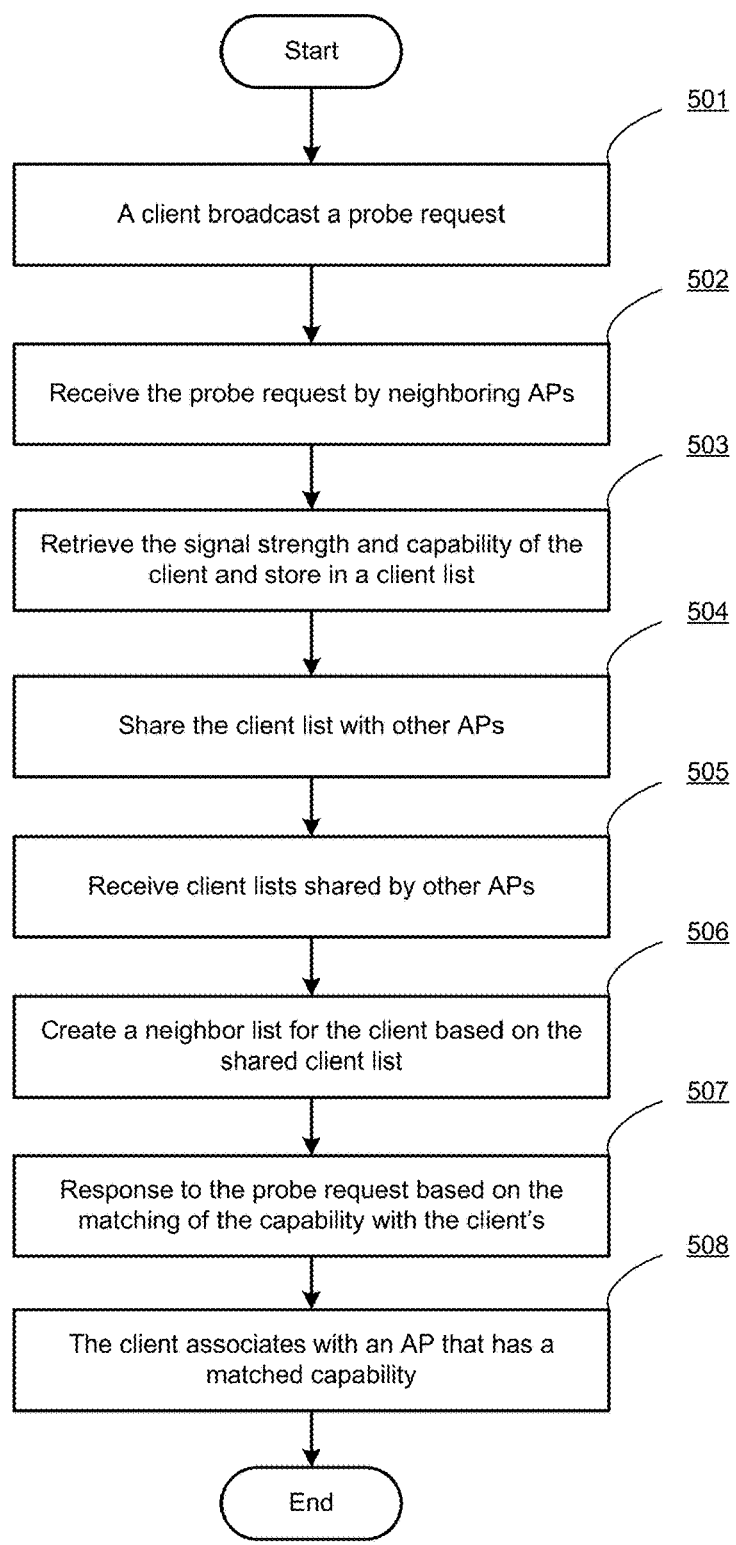
FIG. 5 is a flow diagram illustrating a method for steering a WiFi client to an AP with matched capabilities in accordance with another embodiment of the present invention.

FIG. 5 is a flow diagram illustrating a method for steering a WiFi client to an AP with matched capabilities in accordance with another embodiment of the present invention. In the present embodiment, a WiFi network comprises multiple neighboring APs that serve the same or overlapping areas. In this example, the APs are fat APs that have sufficient program logic and processing power to enforce policies relating to access and usage without an AC. The fat APs of the WiFi network may exchange control information with each other periodically through wired or wireless connections among the APs.

At block 501, a WiFi client broadcasts a probe request when the WiFi client tries to join a WiFi network.

At block 502, the probe request broadcasted by the WiFi client is received by multiple APs near the WiFi client.

At block 503, each AP may determine a measure of signal strength (e.g., Received Signal Strength Indication (RSSI) and Signal-to-Noise Ratio (SNR)) relating to the probe request that is received by the AP. Each AP also determines the capability of the WiFi client by parsing the capability information embedded in the probe request. Each AP may create a WiFi client table with MAC addresses, capability information and corresponding signal strengths. Tables 1-3 show examples of WiFi client tables of APs of a WiFi network.

TABLE 1

| AP1 MAC ADDRESS | AP1 CAPABILITY | WiFi CLIENT | WiFi CLIENT CAPABILITY | SIGNAL STRENGTH |
| --- | --- | --- | --- | --- |
| XX:XX:XX:XX:XX:X1 | 802.11AC WAVE 2 | AA:AA:AA:AA:AA:AA | 802.11AC WAVE 2 | −30 |

TABLE 2

| AP2 MAC ADDRESS | AP2 CAPABILITY | WiFi CLIENT | WiFi CLIENT CAPABILITY | SIGNAL STRENGTH |
| --- | --- | --- | --- | --- |
| XX:XX:XX:XX:XX:X2 | 802.11AC WAVE 1 | AA:AA:AA:AA:AA:AA | 802.11AC WAVE 2 | −30 |

TABLE 3

| AP3 MAC ADDRESS | AP3 CAPABILITY | WiFi CLIENT | WiFi CLIENT CAPABILITY | SIGNAL STRENGTH |
| --- | --- | --- | --- | --- |
| XX:XX:XX:XX:XX:X2 | 802.11n | AA:AA:AA:AA:AA:AA | 802.11AC WAVE 2 | −50 |

At block 504, the WiFi client tables of the APs are shared among the APs of the WiFi network. If the APs of the WiFi network are connected through a wired LAN, an AP may send its WiFi client table by multicasting packets so that all the APs in same virtual LAN (VLAN) may receive it. If the APs are in different VLANs, the WiFi client table may be shared with other APs by unicasting. If APs of the WiFi network are wirelessly connected, an AP may send its WiFi client table to other APs through proprietary packets. The APs of the WiFi network may also share their respective capabilities and position information with other APs through wired or wireless connections when the APs are connected to the WiFi network.

At block 505, each AP receives WiFi client tables shared by the other APs of the WiFi network. WiFi client information may be parsed from the received shared WiFi client tables and may be stored within a local WiFi client database. The capabilities of other APs of the WiFi network may also be parsed and stored within an AP database.

At block 506, each AP may create a neighboring AP table for the requesting WiFi client by combining the WiFi client tables shared by the other APs. The signal strengths of probe requests in the neighboring AP table may be compared with a minimum signal strength to determine whether the APs are suitable for providing WiFi connectivity to the WiFi client. If the signal strength of an AP is lower than the minimum signal strength, it may be excluded from the neighboring AP table. Next, the capabilities of the neighboring APs may be matched with the capability of the WiFi client. The APs that have sufficient capability to support the WiFi client may be kept in the neighboring AP table. The APs with the most closing matching capabilities may be selected as described above with reference to block 406 of FIG. 4A. In this manner, each AP of the wireless network may have a neighboring AP list for the WiFi client as shown below in Table 4.

WAP. A data tunnel and a control tunnel of CAPWAP may be established between an AP and AP management module 620 through network interface 610. Control messages may be exchanged between AP management module 620 and the AP through the control tunnel, and network traffic from/to the AP may be transmitted through the data tunnel.

AP capability database 630 may be used for registering capabilities of APs of the wireless network managed by AC 600. The capabilities recorded by AP capability database 630 may be in various granularities from the names of IEEE 802.11 standards that are supported by the APs to each individual capability specified in the IEEE 802.11 standards.

Client capability database 640 may be created by AP management module 620 to record capabilities of WiFi clients that probe the APs of the WiFi network. For example, when WiFi clients try to join the WiFi network, the WiFi clients may broadcast probe requests to nearby APs. The probe requests received by the APs may be transmitted to AP management module 620 through the control tunnels. AP management module 620 may parse information of the WiFi clients, such as source MAC addresses and capability information from the probe requests and store the information at client capability database 640 when the WiFi clients try to join the WiFi network in the first time. The capability information of WiFi clients may be retrieved from client

TABLE 4

| ID | AP MAC ADDRESS | AP CAPABILITY | WiFi CLIENT | WiFi CLIENT CAPABILITY | SIGNAL STRENGTH | Selected AP |
|---|---|---|---|---|---|---|
| AP1 | XX:XX:XX:XX:XX:X1 | 802.11AC WAVE 2 | AA:AA:AA:AA:AA:AA | 802.11AC WAVE 2 | −30 | Y |
| AP2 | XX:XX:XX:XX:XX:X2 | 802.11AC WAVE 1 | AA:AA:AA:AA:AA:AA | 802.11AC WAVE 2 | −50 | N |
| AP3 | XX:XX:XX:XX:XX:X3 | 802.11n | AA:AA:AA:AA:AA:AA | 802.11AC WAVE 2 | −30 | N |

At block 507, if the AP performing the method of FIG. 5 is one of the selected APs, such as AP1 of Table 4, it responds to the probe request of the WiFi client. APs that are not selected, such as AP2 and AP3 of Table 4, based on the neighboring AP table will not respond to the probe request.

At block 508, the WiFi client may associate with an AP of those that respond to its probe request. As WiFi clients are steered to an AP that has the same or the best matched capability, APs of the WiFi network may offer better service than the random distribution of WiFi clients performed by the prior art.

Figure 6:
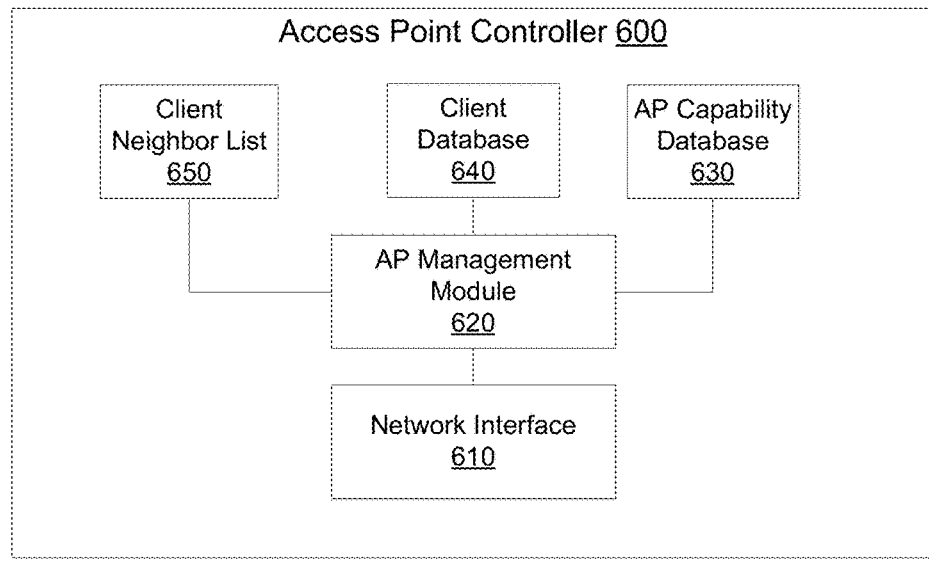
FIG. 6 illustrates exemplary internal components of an AP controller (AC) that steers WiFi clients to APs by matching the capabilities of APs and WiFi clients in accordance with an embodiment of the present invention.

FIG. 6 illustrates exemplary internal components of an AP controller 600 that steers WiFi clients to APs by matching the capabilities of APs and WiFi clients in accordance with an embodiment of the present invention. In the present example, AC 600 comprises a network interface 610, an AP management module 620, an AP capability database 630, a client capability database 640 and a client neighbor list 650.

Network interface 610 may include, but is not limited to, an internal interface with 4-24 or more Ethernet ports, 1-4 or more wide area network (WAN) interfaces and one demilitarized zone (DMZ) interface. AC 600 may connect APs of a private wireless network through the internal interfaces and connect to a public network, such as the Internet, through the WAN interfaces. It will be apparent to one skilled in the art that AC 600 may be a cloud-based access point controller that may connect to APs through the Internet and manage APs across the Internet from a remote location.

AP management module 620 is used for managing APs of a wireless network in accordance with, for example, CAPcapability database 640 when the WiFi clients try to join the WiFi network again. Retrieving capability information from client capability database 640 may be faster than parsing it from probe requests.

Client neighbor list 650 may be dynamically created for each WiFi client at least partially based on signal strengths of the probe requests that are received by nearby APs. A probe request broadcasted by a WiFi client may be received by nearby APs with different signal strengths. AP management module 620 may compare the signal strengths of probe requests received nearby APs with minimum signal strength to determine if the nearby APs are capable of providing wireless connectivity to the WiFi clients. APs with signal strengths higher than the minimum signal strength may be deemed as neighbor APs of the WiFi client and may be stored in client neighbor list 650. If a WiFi client has multiple neighbor APs in client neighbor list 650 and these APs have different capabilities according to AP capability database 630, AP management module 620 may determine which APs of the neighbor APs are suitable for responding to the probe requests according to WiFi client steering rules. If one or more neighbor APs have the same or the most matched capabilities, confirm messages that allows an AP to respond to the probe request is sent back by AP management module 620 to these APs through the control tunnels and these APs respond to the probe request of the WiFi client. The WiFi client may join the WiFi network through one of the APs that responded to its probe request. If AP management module 620 determines that some APs do not have matched capabilities or have weak signal strengths, ignore messages that command these APs to ignore the probe requests may be sent back to these APs. These APs will not respond to the probe request of the WiFi client accordingly.

AP management module 620 may also steer a WiFi client to APs that have the most closely matched capabilities when the WiFi client is roaming to a new AP. For example, when the WiFi client is roaming to a new AP, the new AP receives a probe request from the WiFi client. The new AP forwards the probe request to AP management module 620. AP management module 620 may determine if the new AP is a neighbor AP to the WiFi client and if it has a better matched capability than the current AP with which the WiFi client is associated. If so, AP management module 620 may command the current AP to deauthenticate with the WiFi client and command the new AP to respond to the probe request. Then the WiFi client may roam from the current AP to the new AP.

Figure 7:
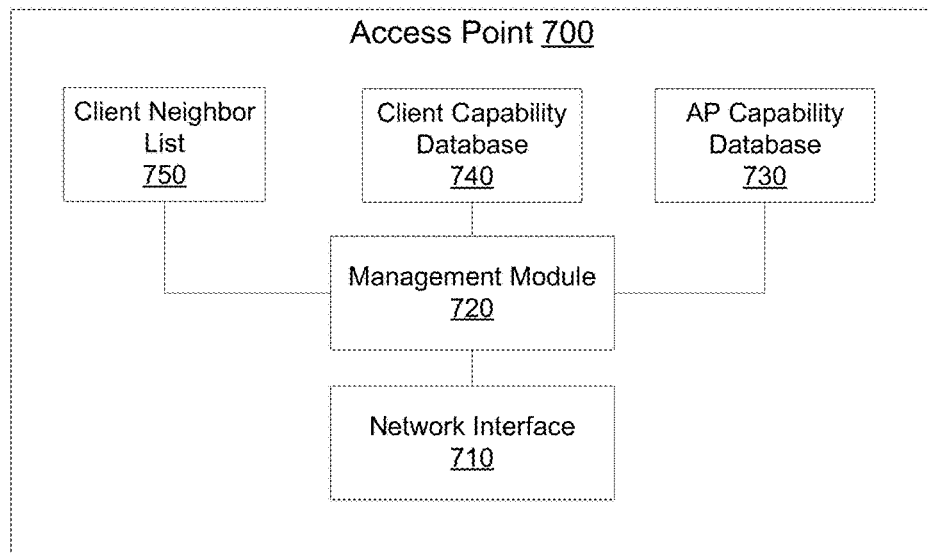
FIG. 7 illustrates exemplary internal components of an AP that steers WiFi clients to APs by matching the capabilities of the AP and WiFi clients in accordance with an embodiment of the present invention.

FIG. 7 illustrates exemplary internal components of an AP 700 that steers WiFi clients to APs by matching the capabilities of the AP and WiFi clients in accordance with an embodiment of the present invention. In the current example, AP 700 is a fat AP that has sufficient program logic and processing power to enforce policies relating to access and usage by itself without managing by an AC. AC 700 comprises a network interface 710, a management module 720, an AP capability database 730, a client capability database 740 and a client neighbor list 750.

Network interface 710 may include, but is not limited to, a wired network interface with an Ethernet port that may connect to a switch of a private network and a wireless network interface that provide wireless connectivity to WiFi clients. Probe requests from nearby WiFi clients may be received from the wireless interface.

Management module 720 is used for steering WiFi clients to APs that have matched capabilities as well as other functions, such as coordinating with other APs and network securities. Management module 720 may multicast or unicast capability information and location information of AP 700 on the private network and receive capability and location information that is multicasted or unicasted by other APs. Management module 720 may store the capability information of other or nearby APs at AP capability database 730.

Client capability database 740 may be created by management module 720 to record capabilities of WiFi clients that probe AP 700. For example, when WiFi clients try to join the WiFi network, the WiFi clients may broadcast probe requests to AP 700. AP management module 720 may parse information of the WiFi clients, such as source MAC addresses and capability information from the probe requests and store the information at client capability database 740 when the WiFi clients probe AP 700 in the first time. The capability information of WiFi clients may be retrieved from client capability database 740 when the WiFi clients probe AP 700 again. Retrieving capability information from client capability database 740 may be faster than parsing it from probe requests.

Client neighbor list 750 may be created for a WiFi client by management module 720 for determining which APs should be used for serving the WiFi client. Information of the client, such as the MAC address of the WiFi client may be stored a client neighbor list 750. Information of AP 700, such as a MAC address and capabilities of AP 700, signal strength of the probe request may also be stored at client neighbor list 750. Client neighbor list 750 may be shared with other APs of the WiFi network by management module 720 through multicasting or unicasting. If one or more client neighbor list shared by other APs of the WiFi network are received by management module 720, the client neighbor lists from the same WiFi client received from other APs are combined with client neighbor list 750 of AP 700. The combined client neighbor list 750 may contain information of the WiFi client and information of APs that receive probe requests from the same WiFi client. Management module 720 may filter APs that have weak signal strengths out of client neighbor list 750 if signal strengths of the APs contained in client neighbor list 750 are lower than minimum signal strength. Management module 720 may further compare capabilities of APs in client neighbor list 750 with the capability of the WiFi client and select the aps with matched capabilities. If AP 700 itself is one of the APs that have matched capabilities, then AP 700 responds to the probe request of the WiFi client. If management module 720 determines that other neighbor APs in client neighbor list 750 have better matched capabilities than itself, management module 720 may determine that AP 700 does not respond to the probe request from the WiFi client because these neighbor APs will respond to the probe request.

Management module 720 may also steer a WiFi client to APs that have matched capabilities when the WiFi client is roaming to a new AP. For example, when the WiFi client is roaming to AP 700, AP 700 receives a probe request from the WiFi client. Management module 720 may determine if AP 700 is a neighbor AP to the WiFi client and if it has a better matched capability than the current AP that is serving the WiFi client based on client neighbor list 750 received from the current AP. If so, management module 720 may command the WiFi client to deauthenticate with the current AP and provide connectivity to the WiFi client by AP 700.

Figure 8:
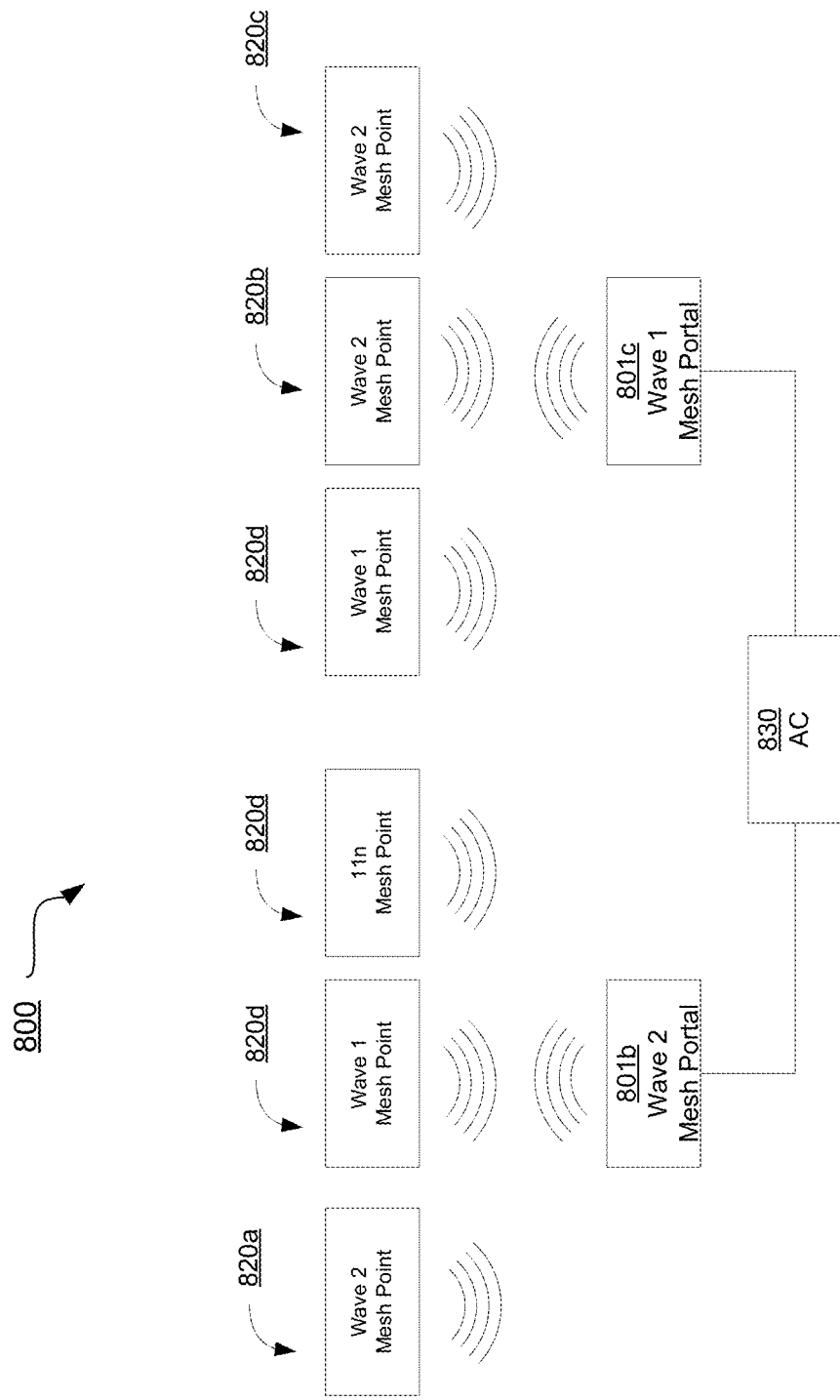
FIG. 8 illustrates mesh point distribution among multiple neighboring mesh portals in a prior art mesh WiFi network.

Embodiments of the present invention may be used in other wireless networking scenarios, including, but not limited to, a mesh network. FIG. 8 illustrates mesh point distribution among multiple neighboring mesh portals in a prior art mesh WiFi network 800. Mesh WiFi network 800 comprises a AC 830, multiple mesh portals 801b and 801c, multiple mesh points 820a-820d. In this example, mesh portal 801b is an 802.11ac Wave 2 AP and mesh portal 801c is an 802.11ac Wave 1 AP. Mesh points 820a-820c are 802.11ac Wave 2 APs and mesh points shown as 820d are 802.11ac Wave 1 and 802.11n APs. As mesh portals 801 and mesh points 820 are neighbor APs, any mesh points 820 may connect to any mesh portal 801 when a mesh network is established by AC 830. In this example, mesh portal 801b is serving mesh points 820a and 820d and mesh portal 801c is serving mesh points 820b, 820c and 820d. Each mesh portal 801 is serving mesh points 820 with mixed capabilities and some of the mesh points have capabilities that are not optimally matched with the capability of the mesh portal.

Figure 9:
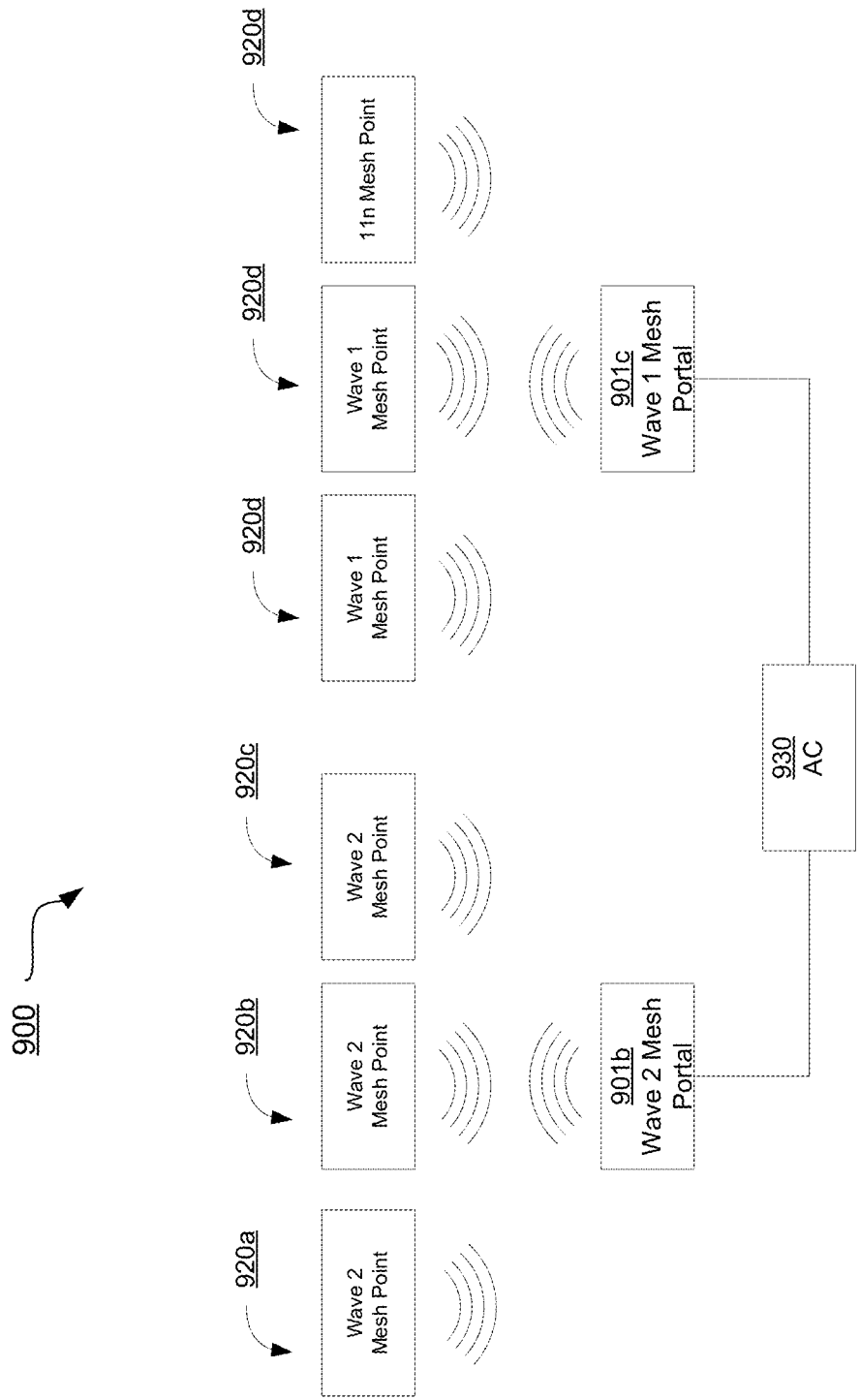
FIG. 9 illustrates mesh point distribution among multiple neighboring mesh portals in accordance with an embodiment of the present invention.

FIG. 9 illustrates mesh point distribution among multiple neighbor mesh portals in accordance with an embodiment of the present invention. In FIG. 9, mesh network 900 comprises neighbor mesh portals 901b, 901c and mesh points 920a-d that are controlled by an AC 930. In this example, when a mesh point 920 try to join mesh network 900, the probe request is broadcasted to nearby mesh portals 901b and 901c. The probe request is received by mesh portals 901b and 901c and forwarded to AC 930. AC 930 then steers mesh point 920 to a mesh portal that has a matched capability. The matching process of mesh points and mesh portals is the same as matching WiFi clients and APs. After mesh points are steered to mesh portals with matched capabilities, mesh portal 901b with 802.11ac Wave 2 is serving only mesh points 920a-c that have the same capability of 801.11ac Wave 2 and mesh portal 901c with 802.11ac Wave 1 is serving mesh points 920d that have 802.11ac Wave 1 or lower capabilities. Each mesh portal may provide better connectivity to its mesh points as the mesh portal and its mesh points have best matched capabilities.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   receiving, by a plurality of access points (APs) of a wireless local area network (WLAN), a probe request sent from a WLAN client desiring to join the WLAN;
   forwarding, by each of the plurality of APs, the probe request to an AP controller (AC) that controls the plurality of APs;
   selecting, by the AC, one or more APs of the plurality of APs based at least on a comparison of capabilities of the WLAN client and capabilities of the plurality of APs, wherein the capabilities of the WLAN client represent one or more specific features of one or more particular WiFi standards supported by the WLAN client and the capabilities of the plurality of APs represent one or more specific features of one or more particular WiFi standards supported by the plurality of APs; and
   allowing the WLAN client to join the WLAN through at least one AP of the one or more selected APs by causing the at least one AP to accept the probe request by sending, by the AC, a confirmation to the at least one AP of the one or more selected APs.

2. The method of claim 1, further comprising:
   determining, by the AC, a set of neighbor APs of the WLAN client from among the plurality of APs; and
   selecting, by the AC, one or more APs from the set of neighbor APs based at least on a comparison of the capabilities of the WLAN client and the capabilities of the APs in the set of neighbor APs.

3. The method of claim 2, further comprising:
   comparing, by the AC, signal strengths of the probe request received by each of the multiple APs;
   if a signal strength of the probe request received by an AP of the multiple APs is greater than a predefined or configurable threshold, including, by the AC, the AP within the set of neighbor APs of the WLAN client.

4. The method of claim 2, wherein said selecting, by the AC, one or more APs from the set of neighbor APs based at least on a comparison of the capabilities of the WLAN client and the capabilities of the APs in the set of neighbor APs further comprises:
   first attempting to identify those of the APs within the set of neighbor APs, if any, having capabilities matching those of the WLAN client; and
   when none of the APs within the set of neighbor APs have capabilities matching those of the WLAN client, then selecting, by the AC, those of the APs within the set of neighbor APs having capabilities closest to those of the WLAN client.

5. The method of claim 4, wherein said selecting, by the AC, those of the APs within the set of neighbor APs having capabilities closest to those of the WLAN client further comprises:
   when the capabilities of those of the APs within the set of neighbor APs closest to the capabilities of the WLAN client are lesser than the capabilities of the WLAN client, then favoring APs having relatively greater capabilities; and
   when the capabilities of those of the APs within the set of neighbor APs closest to the capabilities of the WLAN client are greater than the capabilities of the WLAN client, then favoring APs having relatively lesser capabilities.

6. The method of claim 1, further comprising:
   extracting, by the AC, information regarding the capabilities of the WLAN client from the probe request; and
   storing, by the AC, the information regarding the capabilities of the WLAN client in a database.

7. The method of claim 1, further comprising:
   receiving, by a new AP of the WLAN, a probe request from the WLAN client;
   forwarding, by the new AP, the probe request to the AC;
   when a determination is made by the AC that the WLAN client is roaming from a current AP to the new AP and capabilities of the new AP are more closely matched to the capabilities of the WLAN client, then sending, by the AC, a deauthentication command to the current AP.

8. An access point controller (AC) for controlling a plurality of access points (APs) of a wireless local area network (WLAN), the AC comprising:
   a non-transitory storage device having embodied therein instructions representing a WLAN client steering application; and
   one or more processors coupled to the non-transitory storage device and operable to execute the WLAN client steering application to perform a method comprising:
      receiving a plurality of probe requests from the plurality APs representing a single probe request originated by a WLAN client desiring to join the WLAN and being forwarded to the AC by the plurality of APs;
      selecting one or more APs of the plurality of APs based at least on a comparison of capabilities of the WLAN client and capabilities of the plurality of APs, wherein the capabilities of the WLAN client represent one or more specific features of one or more particular WiFi standards supported by the WLAN client and the capabilities of the plurality of APs represent one or more specific features of one or more particular WiFi standards supported by the plurality of APs; and
      allowing the WLAN client to join the WLAN through at least one AP of the one or more selected APs by causing the at least one AP to accept the probe request by sending a confirmation to the at least one AP of the one or more selected APs.

9. The AC of claim 8, wherein the method further comprises:
   determining a set of neighbor APs of the WLAN client from among the plurality of APs; and
   selecting one or more APs from the set of neighbor APs based at least on a comparison of the capabilities of the WLAN client and the capabilities of the APs in the set of neighbor APs.

10. The AC of claim 9, wherein the method further comprises including those of the plurality of APs associated with a probe request of the plurality of probe requests having a signal strength greater than a predefined or configurable threshold within the set of neighbor APs.

11. The AC of claim 9, wherein said selecting one or more APs from the set of neighbor APs based at least on a comparison of the capabilities of the WLAN client and the capabilities of the APs in the set of neighbor APs further comprises:
first attempting to identify those of the APs within the set of neighbor APs, if any, having capabilities matching those of the WLAN client; and
when none of the APs within the set of neighbor APs have capabilities matching those of the WLAN client, then selecting those of the APs within the set of neighbor APs having capabilities closest to those of the WLAN client.

12. The AC of claim 11, wherein said selecting those of the APs within the set of neighbor APs having capabilities closest to those of the WLAN client further comprises:
when the capabilities of those of the APs within the set of neighbor APs closest to the capabilities of the WLAN client are lesser than the capabilities of the WLAN client, then favoring APs having relatively greater capabilities; and
when the capabilities of those of the APs within the set of neighbor APs closest to the capabilities of the WLAN client are greater than the capabilities of the WLAN client, then favoring APs having relatively lesser capabilities.

13. The AC of claim 8, wherein the method further comprises:
extracting information regarding the capabilities of the WLAN client from one of the plurality of probe requests; and
storing the information regarding the capabilities of the WLAN client in a database.

14. The AC of claim 8, wherein the method further comprises:
receiving a forwarded probe request originated by the WLAN client and received by a new AP of the WLAN;
when a determination is made that the WLAN client is roaming from a current AP to the new AP and capabilities of the new AP are more closely matched to the capabilities of the WLAN client, then sending a deauthentication command to the current AP.

15. The method of claim 1, wherein the capabilities of the WLAN client include support for multiple user-multiple input/multiple output (MU-MIMO) functionality specified by Institute of Electrical and Electronics Engineers (IEEE) 802.11ac Wave 2.

16. The method of claim 1, wherein the capabilities of at least one of the plurality of APs include support for MU-MIMO functionality specified by IEEE 802.11ac Wave 2.

17. The AC of claim 8, wherein the capabilities of the WLAN client include support for MU-MIMO functionality specified by IEEE 802.11ac Wave 2.

18. The AC of claim 8, wherein the capabilities of at least one of the plurality of APs include support for MU-MIMO functionality specified by IEEE 802.11ac Wave 2.

* * * * *